(12) United States Patent
Grace

(10) Patent No.: US 6,329,952 B1
(45) Date of Patent: Dec. 11, 2001

(54) AUTOMOBILE RADAR ANTENNA ALIGNMENT SYSTEM USING TRANSPONDER AND LASERS

(75) Inventor: Martin I. Grace, San Jose, CA (US)

(73) Assignee: Anritsu Company, Morgan Hill, CA (US)

( * ) Notice: Subject to any disclaimer, the term of this patent is extended or adjusted under 35 U.S.C. 154(b) by 0 days.

(21) Appl. No.: 09/587,539

(22) Filed: Jun. 1, 2000

Related U.S. Application Data

(63) Continuation of application No. 09/252,492, filed on Feb. 17, 1999.

(51) Int. Cl.$^7$ ..................................... H01Q 1/32
(52) U.S. Cl. ..................... 343/703; 343/713; 340/903; 342/174
(58) Field of Search ..................... 343/703, 713; 340/903; 342/174; 356/385

(56) References Cited

U.S. PATENT DOCUMENTS

| | | | |
|---|---|---|---|
| 4,041,494 | 8/1977 | Ewen et al. | 343/112 |
| 5,111,210 | 5/1992 | Morse | 342/455 |
| 5,313,213 | 5/1994 | Neumann et al. | 342/165 |
| 5,314,037 | 5/1994 | Shaw et al. | 180/169 |
| 5,646,612 | 7/1997 | Byon | 340/903 |
| 5,977,906 | 11/1999 | Ameen et al. | 342/174 |

FOREIGN PATENT DOCUMENTS

| | | | |
|---|---|---|---|
| PCT/DE97/ 02828 | 12/1997 | (DE) | H01Q/1/12 |
| 197 07 590 A1 | 9/1998 | (DE) | H01Q/3/08 |
| 9300071 | 4/1995 | (GB) | H01Q/1/32 |

*Primary Examiner*—Don Wong
*Assistant Examiner*—Hoang Nguyen
(74) *Attorney, Agent, or Firm*—Fliesler, Dubb, Meyer & Lovejoy LLP

(57) ABSTRACT

A transponder (200) is attached to a laser alignment fixture (210) and used to align an automobile collision avoidance radar antenna boresite with the thrust vector of the vehicle. The alignment fixture (210) has attached reflectors for alignment with two laser beams. To align the collision avoidance radar, the transponder (200) is positioned along the thrust vector of the automobile using a first laser beam (203) aligned perpendicular to a wheel axle. The first laser beam (203) is aligned when transmitted from the wheel axle onto a first piece of reflective material attached to the alignment fixture (210). A second laser (216) is provided parallel to the centerline of the collision avoidance radar antenna to remove azimuth and elevation translation errors between the transponder antenna centerline and the collision avoidance radar antenna centerline. The second laser beam (216) is aligned when transmitted from the automobile onto a second piece of reflective material attached to the alignment fixture (210). The transponder (200) is then used to zero an angle ($\alpha$) between the electrical boresite of the collision avoidance radar antenna and the boresite of the transponder antenna. The angle ($\alpha$) is set to zero by adjusting the automobile collision avoidance radar antenna until a processor in the collision avoidance radar indicates the angle $\alpha$ is zero.

14 Claims, 3 Drawing Sheets

AUTOMOBILE RADAR ANTENNA ALIGNMENT SYSTEM USING TRANSPONDER AND LASERS

This application is a continuation-in-part of application Ser. No. 09/252,492, filed Feb. 17, 1999, entitled "Universal Autoradar Antenna Alignment System," now U.S. Pat. No. 6,087,995.

BACKGROUND OF THE INVENTION

1. Field of the Invention

The present invention relates to a test system used to align the boresite of a radar antenna. More particularly, the present invention relates to a test system that is used to align the boresite of an automotive radar system antenna with a mechanical reference (e.g., the thrust vector) from a vehicle on which the radar is mounted.

2. Description of the Related Art

Recently, manufacturers have begun producing radar systems for automobiles. Such systems have been used in combination with a vehicle cruise control to form an automotive radar system. An automotive radar system transmits a signal from an antenna typically located in the grill area of an automobile. The presence of and distance to an object from the automotive radar antenna is determined from the signal reflected by the object. If an object is detected in the path of the vehicle, wheel braking or engine deceleration is applied by the automotive radar system to maintain a desired distance from the object and to prevent the vehicle from striking the object.

To assure proper performance of a automotive radar system, the device must be regularly tested. During testing, proper alignment of the automotive radar antenna boresite angle with a mechanical reference line, such as a thrust vector of the vehicle which identifies the forward direction of travel of the vehicle, must be achieved. An automotive radar antenna boresite may become misaligned due to vehicle vibrations, vehicle collisions, or other factors. The boresite angle must be properly aligned to prevent the radar system from encountering false or inaccurate readings from signals received from vehicles in adjacent lanes, and to ensure proper detection of vehicles or objects in the immediate lane.

To align the boresite of the automotive radar antenna for FM-CW and Pulse modulated radar systems, a Doppler shifted signal is not generally required for the radar. A passive trihedral target reflector may be used for testing and mechanically aligned at a point in space along the vehicle thrust vector. With the trihedral target so aligned, the position and orientation of the antenna are set to maximize the energy reflected back to the automotive radar from the trihedral target.

Frequency shift keying (FSK) modulated radars require a Doppler shift in order for the radar to respond. To align the FSK radar along the vehicle thrust vector, either the vehicle must be moving relative to a trihedral target, or the target moving, and the antenna aligned to maximize reflected energy.

U.S. Pat. Application Ser. No. 09/252,492 discloses use of interferometers in combination with a transponder to perform alignment. The interferometers enable a display reading to be provided from the transponder so that an operator can align the boresite of the automotive antenna with the thrust vector of a vehicle using the display. The transponder also provides a return signal to the automotive radar to simulate an object at a desired distance from the automotive radar. The transponder can provide a Doppler shift enabling FSK modulated, as well as other types of modulated radar signals to be tested.

SUMMARY OF THE INVENTION

In accordance with the present invention, a transponder attached to a laser alignment fixture is used to align an automotive radar antenna boresite with the thrust vector of the vehicle. Reflectors are attached to the alignment fixture for initial alignment using two laser beams. The transponder verifies the performance of the automotive radar by simulating a target radar return at a desired distance. A reading from the automotive radar processor is used by an operator, for final alignment, so interferometer antennas and associated display in the transponder are not needed.

To align the automotive radar, the transponder is first positioned along the thrust vector of the automobile using a first laser beam aligned perpendicular to a wheel axle. The first laser beam is aligned when transmitted from a fixture attached to the wheel axle onto a first piece of reflective material attached to the alignment fixture supporting the transponder.

To further align the transponder antenna with the centerline of the automotive radar antenna, a second laser, aligned with a centerline of the automotive radar antenna, is provided to remove azimuth and elevation translation errors ($\Delta x$) and ($\Delta y$) between the transponder antenna and the automotive radar antenna. The second laser beam is aligned when transmitted from the vehicle near the automotive radar antenna onto a second piece of reflective material attached to the alignment fixture supporting the transponder.

The transponder provides a return signal in response to the automotive radar signal used to zero an angle ($\alpha$) between the electrical boresite of the automotive radar antenna and the boresite of the transponder antenna. The angle ($\alpha$) between the boresite of the automotive radar antenna and the transponder antenna is set to zero by adjusting the automotive radar antenna position until a signal processor provided in the automotive radar indicates the angle a is zero.

In the transponder, the RF signal from the automotive radar is downconverted to an IF signal. The IF signal is then delayed a desired amount and then upconverted for retransmission to the automotive radar. The retransmitted signal enables the transponder to simulate a target spaced a desired distance from the automotive radar. A Doppler offset can be provided during upconversion of the IF signal to simulate a target moving at a desired rate of speed relative to the automotive radar. Such a Doppler shift enables a FSK modulated automotive radar system to be tested along with other systems.

BRIEF DESCRIPTION OF THE DRAWINGS

Further details of the present invention are explained with the help of the attached drawings in which.

DETAILED DESCRIPTION

Figure 1:
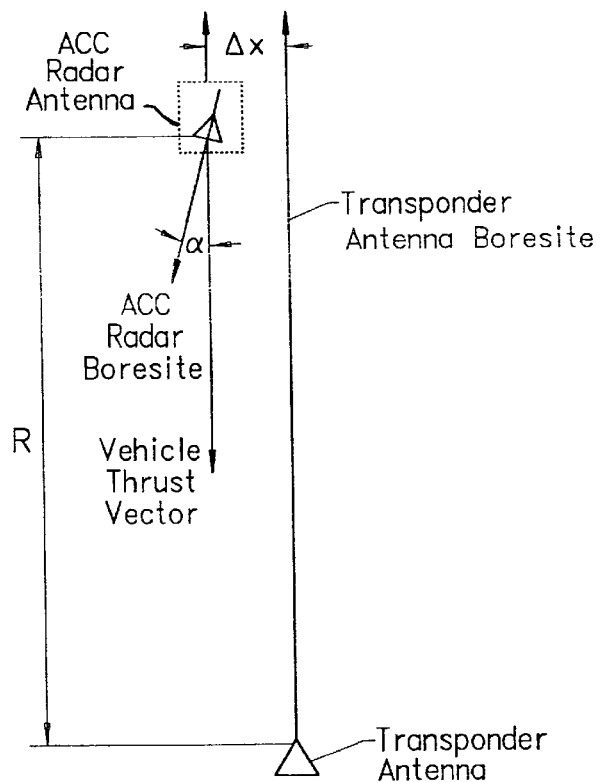
FIG. 1 illustrates boresite alignment discrepancies of an automotive radar antenna relative to the thrust vector of an automobile and translation offset of the automotive radar antenna relative to the antenna of the transponder.

The automotive radar antenna on the vehicle can be misaligned due to vibrations during use of the vehicle. The present invention provides for alignment of the automotive antenna with the thrust vector of a vehicle and removal of mechanical translation errors and electrical boresite alignment discrepancies. FIG. 1 illustrates a translation offset $\Delta x$ between the automotive radar antenna centerline and the centerline of the transponder antenna aligned with an x-axis. FIG. 1 also shows the angular transmit and electrical boresite error $\alpha$ as the angle formed between the automotive radar boresite and the vehicle thrust vector. The automotive radar is considered to be properly aligned when the translation errors, such as $\Delta x$, and the electrical boresite angle $\alpha$ are all zero.

Figure 2:
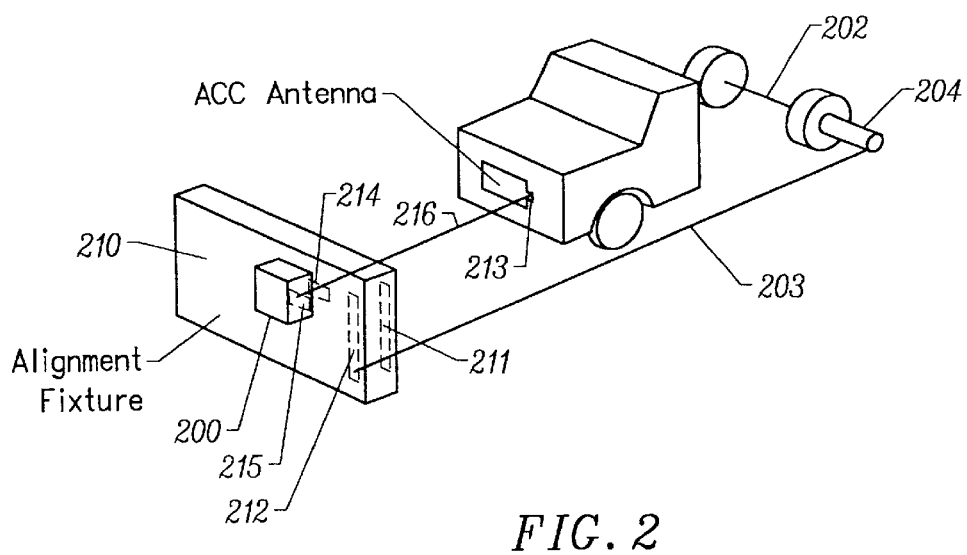
FIG. 2 illustrates alignment of the transponder antenna with the thrust vector of an automobile.

FIG. 2 illustrates steps for initial alignment of the transponder antenna with the thrust vector of an automobile. The vehicle thrust vector is defined as a vector in the x-y plane that is perpendicular to a wheel axle of a vehicle. A vehicle thrust vector can be identified as perpendicular to the rear wheel axle 202 of the vehicle using a laser beam positioning fixture 204. The laser beam positioning fixture 204 is attached to the vehicle axle 202 and transmits a laser beam 203 which is aligned by the fixture 204 to be perpendicular to the rear axle 202. The fixture 204 is a device commonly used for wheel alignment. The transponder 200 is attached to a laser alignment fixture 210, so that when the centerline of the antenna of transponder 200 is approximately aligned with the vehicle thrust vector, the laser beam from fixture 204 will be transmitted through a narrow slot 211 in the alignment fixture 210 and will impinge upon a thin reflective stripe 212 on the back wall of the fixture 210. An operator when observing the laser beam on the reflective stripe 212 can determine when the transponder antenna centerline is aligned with the vehicle thrust vector.

Although not shown in FIG. 2, the reflective stripe 212 can be replaced by a mirror and a sensor can be used in the fixture 204 to indicate when the transponder antenna is aligned with the vehicle thrust vector. Also, the portion of the alignment fixture 210 containing the slot 211 can be removed and only the reflective stripe 212 used for alignment within the scope of the present invention.

Figure 3:
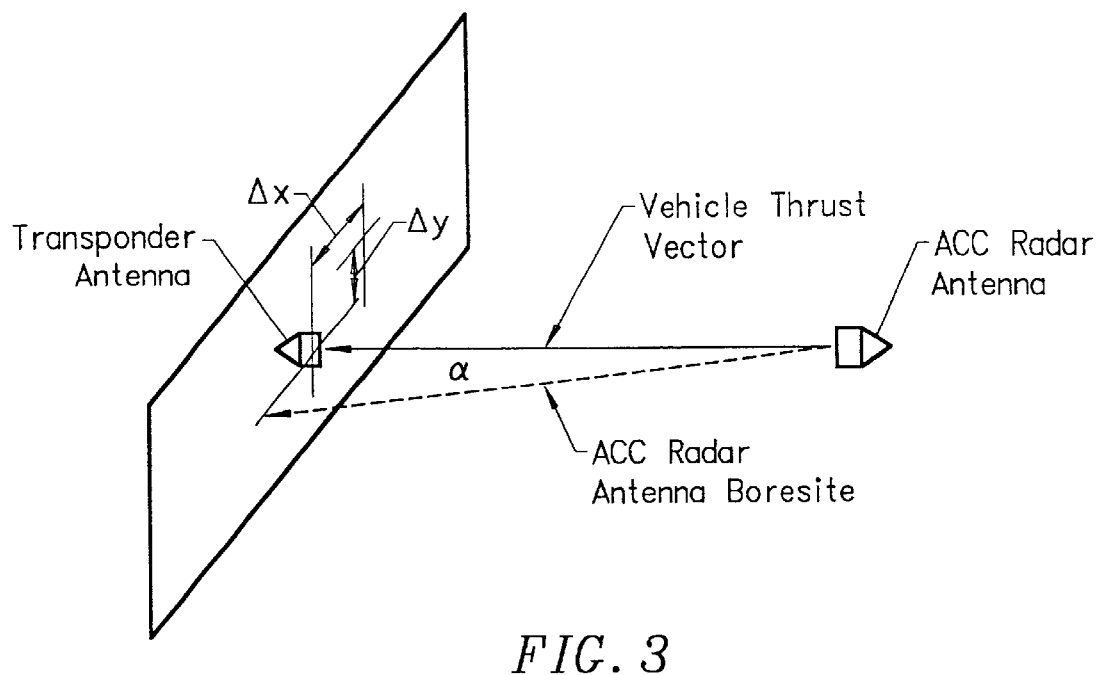
FIG. 3 illustrates movement of the transponder antenna relative to an automotive radar antenna to remove translation errors.

After alignment of the transponder antenna centerline with a vehicle thrust vector, the transponder antenna is further aligned with a centerline of the automotive radar antenna to remove any translation offsets. Translation offsets are defined as mechanical deviations $\Delta x$ and $\Delta y$ from the projection of the vehicle thrust vector upon a perpendicular plane at a distance R from a boresite for the transponder antenna as illustrated in FIG. 3.

To remove the translation offset, a second laser beam 216 attached to the automobile and a reflective stripe 215 attached to the alignment fixture 210 are used. When the translation offsets $\Delta x$ and $\Delta y$ are zero, the second laser beam 216 will be transmitted through a narrow slot 214 in the alignment fixture 210 of the transponder and will impinge upon a thin reflective stripe 215 on the back wall of the fixture 210. An operator can move the alignment fixture and observe the second laser beam on the reflective stripe 215 to determine when the transponder antenna centerline is aligned along the vehicle thrust vector.

Although not shown in FIG. 2, the reflective stripe 215 can be replaced by a mirror and a sensor can be included with the laser fixture 213 for alignment. Also, the portion of the alignment fixture 210 containing the slot 214 can be disconnected from the portion containing the reflective stripe 215 within the scope of the present invention. The laser 213 can be located separate from the automotive radar or be combined as part of the automotive radar.

In another embodiment within the scope of the present invention, the second laser beam could be provided from a laser attached to the alignment fixture instead of the automobile. Accordingly, the reflective stripe 215 would be located on an automobile, or combined as part of the automotive radar. To set translation offsets $\Delta x$ and $\Delta y$ to zero, the second laser beam would then be transmitted from the alignment fixture 210 to the reflective stripe on the automotive radar.

Once the translation offsets $\Delta x$ and $\Delta y$ are removed, a first signal is transmitted from the automotive radar to the transponder. In response, the transponder transmits a return signal to the automotive radar system. The automotive radar then downconverts the return signal from the transponder to provide digital data which can be processed to indicate where a target simulated by the transponder is located relative to the automotive radar. The processing of the downconverted return signal can be accomplished using a digital signal processor or microprocessor. The result or output of the automotive radar signal processor will include the angle $\alpha$. The angle a represents the offset of the electrical boresite of the automotive radar from the electrical boresite of an antenna of the transponder as represented in FIGS. 1 and 3. An example angle $\alpha$ output from the automotive radar might be two degrees to the left or right. The output can be shown on the display of the automotive radar system, or on the display of a separate test device connected to the automotive radar system. The automotive radar antenna can then be adjusted by an operator until the angle $\alpha$ is zero.

Figure 4:
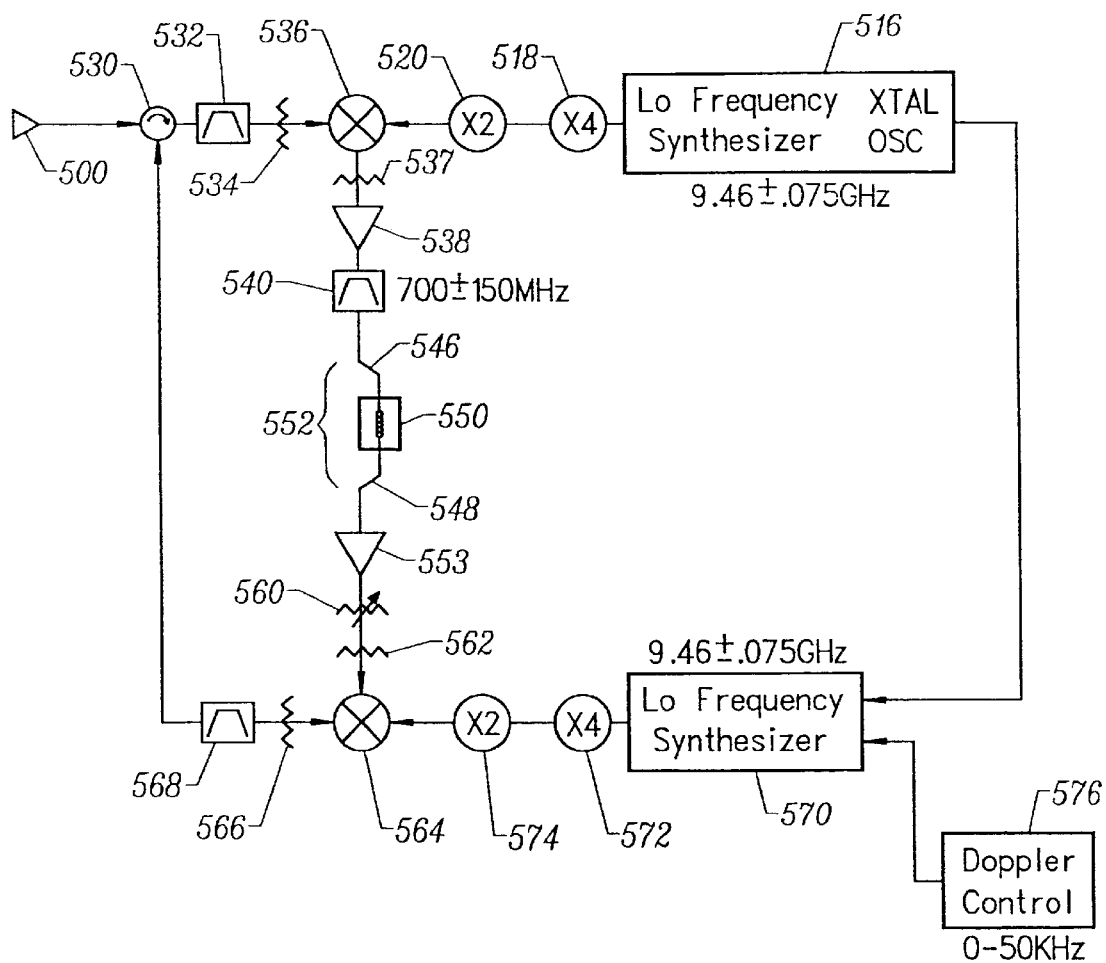
FIG. 4 shows components of the transponder according to the present invention.

A block diagram for the transponder is shown in FIG. 4. The transponder antenna 500 can be designed to receive signals within a typical automotive radar range of 76.5±0.5 GHz to cover the full 76–77 GHz frequency range allocated by the Federal Communications Commission (FCC) for automotive radar systems used in the United States. A typical automotive radar spreads the spectrum of the radar signal over as much as 250 or more MHZ with a center frequency near 76.5 GHz. A given automotive radar system may operate over any portion of the 76–77 GHz frequency band assigned by the FCC.

A signal received by the antenna 500 is provided to one terminal of a circulator 530. A second terminal of the circulator 530 provides the signal through a bandpass filter 532 and attenuator pad 534 to a first input of a harmonic downconverter 536. The bandpass filter 532 serves to limit noise outside the desired 76–77 GHz region of the signal. A second input of the downconverter 536 is provided from the LO synthesizer 516 through the x4 multiplier 518 and x2 multiplier 520. The output of the downconverter 536 then provides an IF signal through an attenuator pad 537, amplifier 538 and bandpass filter 540. The bandpass filter 540 is designed to operate over the desired IF bandwidth and eliminate noise outside the IF bandwidth. A representative IF bandwidth for the filter 540 is shown as 700±150 MHz.

The IF signal is provided to a pair of switches 546 and 548. The switches 546 and 548 are controlled to connect either a BAW delay line 550 or a through line 552 from the bandpass filter 540 to the input of an amplifier 553. The output of amplifier 553 is provided through a radar cross section (RCS) control attenuator 560 and pad 562 to a first input of a harmonic upconverter 564. The output of upconverter 564 is then provided for retransmission as described in more detail to follow.

To simulate the delay and amplitude of a target with the specified radar cross section (RCS) at a range of 7 meters, the thru line 552 is connected between the switches 546 and 548. The 7 meters distance is created by separating the transponder antenna and the automotive radar antenna by approximately 7 meters to satisfy the Fraunhofer conditions. The amplitude of the signal from the through line can be controlled by RCS control attenuator 560 so that a signal retransmitted by the transponder simulates a return from a target having the specified RCS spaced 7 meters from the automotive antenna.

To simulate the delay and amplitude of a target with a specified RCS at a range of approximately 120 meters or more, the BAW delay line 550 is connected between switches 546 and 548. The RCS control attenuator 560 can likewise be set to so that a retransmitted signal from the transponder simulates the amplitude of a signal reflected from a specified target at approximately 120 meters.

To provide upconversion, a second input of the upconverter 564 is received from a LO synthesizer 570 through a x4 multiplier 572 and a x2 multiplier 574. The LO synthesizers 516 and 570 are preferably high resolution frequency synthesizers, such as the 68A-Series or 68B-Series Synthesized Sources available from Anritsu Corporation, Morgan Hill, Calif. Such commercial synthesizers can provide a 0.1 Hz resolution with isolation as low as −80 dB.

The LO synthesizers 516 and 570 are phase locked using a connection from the crystal oscillator of one device provided to the other. The LO synthesizer 570 can be controlled to provide an output with the same frequency as the output from LO synthesizer 516. Doppler offset control information to vary the output frequency of the LO synthesizer 570 from the LO synthesizer 516 can likewise be provided to enable Doppler shift simulation in a retransmitted signal from the transponder. A suggested frequency range for the LO synthesizer 570 is shown as 9.46±0.075 GHz, while a suggested 0–50 KHz Doppler offset range is likewise shown in FIG. 5.

The output of the upconverter 564 is provided through a pad 566 and bandpass filter 568 to a third terminal of the circulator 530. The bandpass filter 568 serves to eliminate undesirable harmonics from the upconverter 564 output. The circulator 530 then provides the upconverted signal back to the antennas 501–504 for retransmission. The upconverted signal as retransmitted enables the transponder to simulate a target spaced a desired distance from the automotive radar. A Doppler offset provided during upconversion allows simulation of a target moving at a desired rate of speed relative to the automotive radar, and further enables the transponder to be used for testing a FSK modulated automotive radar system.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A method of aligning an automotive radar antenna of a collision avoidance radar system installed in an automobile comprising the steps of:

providing a first laser beam approximately perpendicular to an axle of the automobile;

moving a transponder and determining when the light from the first laser beam is reflected from a first reflective material on an alignment fixture supporting the transponder;

providing a second laser beam from the automobile aligned approximately parallel with the centerline of the radar antenna;

removing translation errors by moving the alignment fixture and determining when light from the second laser beam is reflected from a second reflective material on the alignment fixture;

transmitting a first RF signal from the radar antenna to a transponder antenna;

transmitting a return RF signal from the transponder antenna in response to the first RF signal; and adjusting the boresite position of the radar antenna until a processor indicates, based on the receipt of the return RF signal, that the boresite of the radar antenna is aligned with the boresite of the transponder antenna.

2. The method of claim 1, further comprising the steps of:

downconverting the first RF signal to provide an intermediate frequency signal;

delaying the intermediate frequency signal; and upconverting the frequency of the intermediate frequency signal to provide the return RF signal.

3. The method of claim 2, wherein a Doppler shift is provided to the return RF signal during the step of upconverting.

4. A method of testing an automobile collision avoidance radar system installed in an automobile comprising the steps of:

positioning a transponder antenna of a transponder approximately along a mechanical reference line from the automobile;

removing translation errors by moving the transponder antenna so that the transponder antenna centerline is approximately aligned with a centerline of an automotive radar antenna of the collision avoidance radar system;

transmitting a first signal from the radar antenna to the transponder antenna;

transmitting a return signal from the transponder antenna in response to the first signal;

adjusting the boresite position of the radar antenna until the collision avoidance radar system indicates, based on the receipt of the return signal, that the electrical boresite of the radar antenna is aligned with the electrical boresite of the transponder antenna.

5. The method of claim 4, wherein the step of removing translation errors is performed using the following steps:

providing a laser beam from the automobile aligned approximately parallel with a centerline of the transponder antenna; and moving the alignment fixture until the laser beam is reflected from a reflective material on the alignment fixture.

6. The method of claim 4, wherein the step of removing translation errors is performed using the following steps:

providing a laser beam from an alignment fixture aligned approximately parallel with a centerline of the transponder antenna; and removing translation errors by moving the alignment fixture until the laser beam is reflected back from a reflective material on the automobile.

7. The method of claim 4, further comprising the steps of:

downconverting the first signal from the collision avoidance radar system to provide an intermediate frequency signal;

delaying the intermediate frequency signal; and upconverting frequency of the intermediate frequency signal to provide the return signal.

8. The method of claim 7, wherein a Doppler shift is provided to the conditioned signal during the step of upconverting.

9. An automobile collision avoidance radar antenna alignment system comprising:

a transponder alignment fixture;

a transponder attached to the alignment fixture, said transponder having a transponder antenna;

a first reflective material positioned on the alignment fixture so that a laser beam aligned approximately perpendicular to the automobile wheel axle, when reflected from the first reflective material, will position the transponder antenna approximately along the thrust vector of the vehicle; and a second reflective material positioned on the transponder alignment fixture so that a laser beam aligned approximately parallel to a centerline of an automotive radar antenna of the collision avoidance radar system, when reflected from the second reflective material, will remove translation errors between the centerline of the automotive radar antenna and a centerline of the transponder antenna.

10. The system of claim 9, wherein the transponder comprises:

a transponder antenna;

a first local oscillator;

a first downconverter having a first input coupled to the output of the antenna, a second input coupled to the first local oscillator, and having an output;

switches for selectively coupling one of at least two delay elements from the output of the second down converter with a first node;

a second local oscillator; and an upconverter having a first input coupled to the first node, a second output coupled to the second local oscillator, and an output coupled to the antenna.

11. The system of claim 10, wherein one of the delay elements comprises a bulk acoustic wave delay line.

12. The system of claim 10, wherein one of the delay elements comprises a through line.

13. The system of claim 10, wherein the first and second local oscillators are phase locked, and the second local oscillator is controlled to have a frequency offset from the first local oscillator to provide a desired Doppler shift in the conditioned signal.

14. The system of claim 10, wherein the transponder alignment fixture includes a narrow slot positioned so that the transponder will be positioned along the thrust vector of the automobile when the laser beam passes through the narrow slot and is reflected from the first reflective material.

\* \* \* \* \*